May 10, 1949. R. L. HALLOCK Re. 23,110

REFRIGERATION

Original Filed Dec. 4, 1937

INVENTOR,
Robert Lay Hallock

BY

Geo. F. Stadlund
his ATTORNEY.

Reissued May 10, 1949 Re. 23,110

UNITED STATES PATENT OFFICE 23,110

REFRIGERATION

Robert Lay Hallock, Larchmont, N. Y.

Original No. 2,215,324, dated September 17, 1940, Serial No. 178,060, December 4, 1937. Application for reissue September 6, 1941, Serial No. 409,903

5 Claims. (Cl. 62—108.5)

My invention relates to grids for ice trays, and the nature of my invention will be apparent from the following description and particularly the accompanying drawing, wherein.

Figure 1:
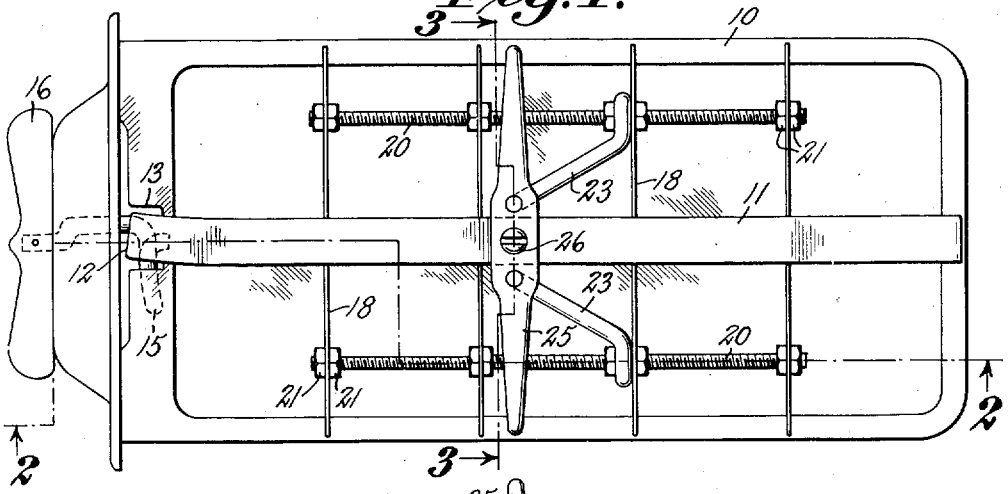
Fig. 1 is a top view of a tray and grid embodying the invention.
Figure 2:
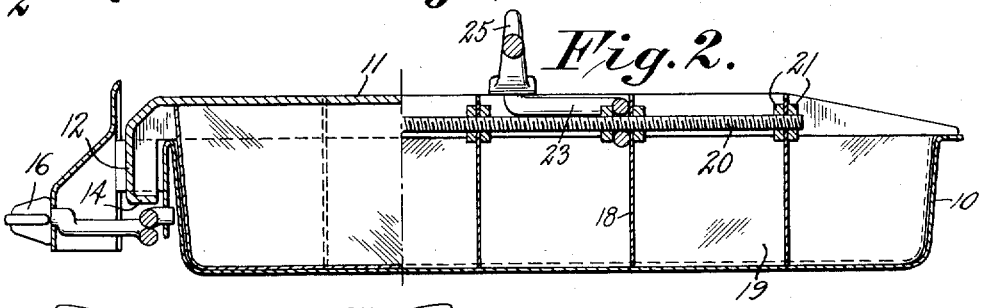
Fig. 2 is taken on the line 2—2 in Fig. 1.
Figure 3:
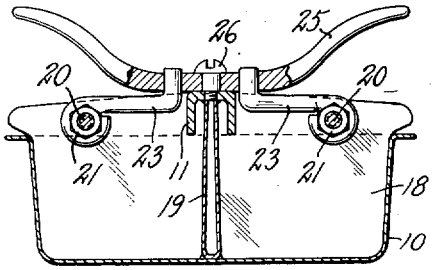
Fig. 3 is taken on the line 3—3 in Fig. 1.
Figure 5:
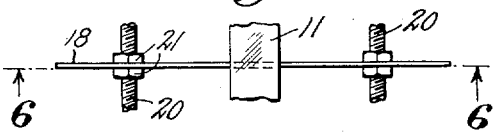
Figs. 5 and 6 show an alternative form.

The grid sets in a pan 10 which is of usual form and made of metal, and which is adapted to rest on the shelf of an evaporator in a refrigerator. The grid includes a longitudinal member 11 extending the full length of the tray longitudinally thereof. Member 11 is stiff and is made of a channel bar. It may be of brass, steel, or other metal. The forward end of this bar 11 projects downwardly at 12 through an aperture 13 in the front wall of the plate. The lower end is closed at 14 to provide an abutment which can be engaged by a turnable member 15. Member 15 is mounted to turn on a horizontal axis by means of a handle 16. If the handle 16 is turned in one direction the member 15 projects downwardly below the bottom of the tray to release the tray from its supporting surface, while on turning the handle 16 in the opposite direction the member 15 contacts the closed end 14 of the part 12 of channel 11 to raise the channel 11 and consequently the grid from the tray to release the frozen contents of the tray from the tray. Generally the device is used to freeze water to form ice cubes. On turning the handle 16 so that the bar 11 is lifted the ice cubes remain attached to the grid and the grid and ice cubes are removed from the tray as a unit.

Figure 6:
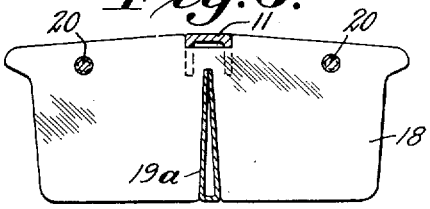
Figure 4:
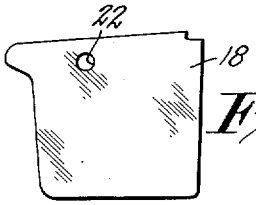
Fig. 4 shows a detail.

Mounted on the bar 11 is a series of transverse webs 18. These webs may extend continuously from side to side as shown in Fig. 6, or the same effect may be had by utilizing the continuity of structure of the bar 11 as by soldering or welding these members to the bar 11.

Depending downwardly from the bar 11 and extending within its inside space is a U-shaped strip 19 which is also made of metal like the other parts and which may be welded or soldered to the bar 11 and also welded at its ends so that it is hermetically sealed.

The webs are connected by means of threaded bars 20 which are held by means of nuts 21 to each of the webs. These pass through holes 22 in the webs. There is one on each side. These members 20 are stiff and tie the wings or webs together. Arms 23 have loops which are placed under certain of the nuts 21 as shown and the other ends of arms 23 pass into holes in a handle 25 which is pivoted by means of a screw 26 on the top of bar 11. By turning member 25 the grid is twisted so that the webs 18 are moved slightly for the release of the ice cubes from the grid without necessitating the application of heat. It will be seen that turning the handle 23 moves the webs in unison.

It will be seen that I have provided a unitary metallic grid structure for disposition in a freezing tray and removability therefrom as a unit. The grid structure comprises a longitudinal wall member which is made up of bar 11 and the members 19 or 19*a*. In the form shown in Fig. 6 the longitudinal wall 19*a* need not be connected to the member 11 but may be connected to the webs. The parts hold themselves together due to the soldering or welding. The transverse wall members need be moved only slightly and therefore need be only somewhat flexible.

What I claim is:

1. The combination with a freezing tray, of a unitary metallic grid structure for disposition in said tray and removable therefrom as a unit comprising a longitudinal member, a plurality of bendable webs connected therewith, a plurality of arms pivotally connected to said longitudinal member, and means whereby movement of said arms causes a bending of said bendable webs to free ice cubes therefrom.

2. The combination with a freezing tray, of a unitary metallic grid structure for disposition in said tray and removable therefrom as a unit comprising a longitudinal member extending substantially the full length of the tray, a plurality of distortable webs connected therewith, each in part movable with respect to the longitudinal member, a plurality of arms pivotally mounted on said longitudinal member, and means whereby movement of said arms causes force multiplication to distort said webs.

3. The combination with a freezing tray, of a unitary grid structure for disposition in said tray and removable therefrom as a unit comprising a longitudinal member, a plurality of bendable webs connected therewith, a plurality of arms pivotally connected to said longitudinal member, and means whereby movement of said arms causes a bending of said bendable webs to free ice cubes therefrom.

4. The combination with a freezing tray, of a unitary grid structure for disposition in said tray and removable therefrom as a unit comprising a longitudinal member extending substantially the full length of the tray, a plurality of distortable webs connected therewith, each in part movable with respect to the longitudinal member, a plurality of arms pivotally mounted on said longitudinal member, and means whereby movement of said arms causes force multiplication to distort webs.

5. The combination with a freezing tray, of a distortable grid for disposition in said tray and removable therefrom as a unit comprising a longitudinal member and a plurality of single walled partitions connected to form a unitary structure, said single walled partitions being embodied in said grid so that individual distortion or flexing of said partitions may be promoted, and a plurality of arms pivotally connected to said longitudinal member and movable to cause individual flexing and distorting of said partitions.

ROBERT LAY HALLOCK.

REFERENCES CITED

The following references are of record in the file of this patent:

UNITED STATES PATENTS

| Number | Name | Date |
|---|---|---|
| 2,035,543 | Gaugler | Mar. 31, 1936 |
| 2,140,923 | Saler | Dec. 20, 1938 |
| 2,286,080 | Geyer | June 9, 1942 |